United States Patent [19]
Remlaoui

[11] Patent Number: 5,197,693
[45] Date of Patent: Mar. 30, 1993

[54] AIRCRAFT TURBINE ENGINE THRUST REVERSER WITH SLIDING HINGE ACTUATOR

[75] Inventor: Jihad I. Remlaoui, Oceanside, Calif.

[73] Assignee: Rohr, Inc., Chula Vista, Calif.

[21] Appl. No.: 745,533

[22] Filed: Aug. 15, 1991

[51] Int. Cl.⁵ .................. B64C 33/04; F02K 3/02
[52] U.S. Cl. .................. 244/110 B; 239/265.29;
239/265.19; 60/226.2
[58] Field of Search .................. 244/110 R, 230, 12.4,
244/12.5, 229; 60/226.2, 226.1; 239/265.29,
265.39, 265.31, 265.19

[56] References Cited
U.S. PATENT DOCUMENTS

| | | | |
|---|---|---|---|
| 3,570,767 | 3/1971 | Lawson et al. | 239/265.29 |
| 3,605,411 | 9/1971 | Maison et al. | 60/226.2 |
| 3,690,561 | 9/1972 | Potter | 239/265.29 |
| 4,410,152 | 10/1983 | Kennedy et al. | 244/110 B |
| 4,485,970 | 12/1984 | Fournier et al. | 244/110 B |
| 5,054,285 | 10/1991 | Geidel et al. | 60/226.2 |

*Primary Examiner*—Galen Barefoot
*Attorney, Agent, or Firm*—Patrick J. Schlesinger; Frank D. Gilliam

[57] ABSTRACT

A thrust reverser system for fan jet type aircraft gas turbine engines using a "sliding hinge" arrangement for moving blocker doors between the stowed and deployed positions. Blocker doors fill a plurality of radially arranged openings in an engine nacelle near the aft end of the nacelle. In the stowed position, each blocker door forms and inner and outer streamlined surface corresponding to the nacelle walls, with no actuator mechanisms extending into the air flow stream within the nacelle. Each blocker door is moved to the deployed position by an extensible rod, such as a hydraulic piston rod, extending between the nacelle near the forward edge of the opening and the approximate centerline of the door. As the door begins to move rearwardly, slider pins on the door edges slide along tracks on the adjacent nacelle islands between adjacent openings. Meanwhile, a hinged bar secured at its aft end to the adjacent nacelle island and at its forward end to the door edge rotates, pivoting the aft end of the door inwardly into contact with the engine core while the door forward end pivots outwardly of the opening. The doors substantially block airflow through the duct between nacelle and core and direct it in an outward, reverse or forward, direction.

7 Claims, 1 Drawing Sheet

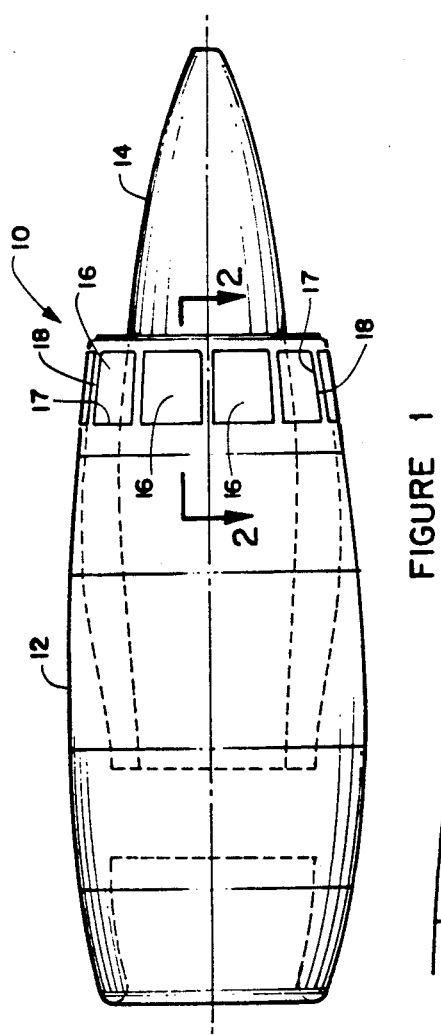
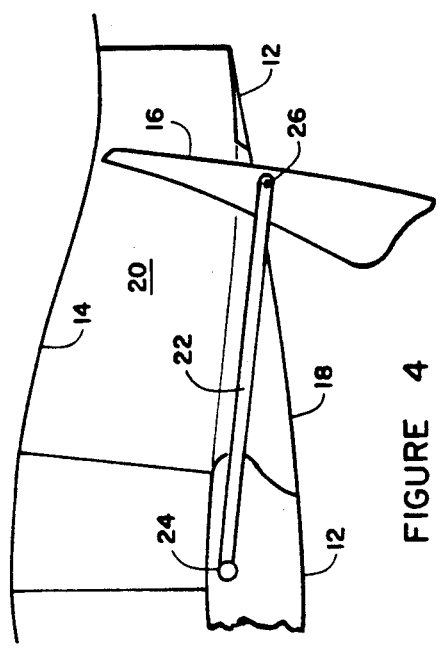
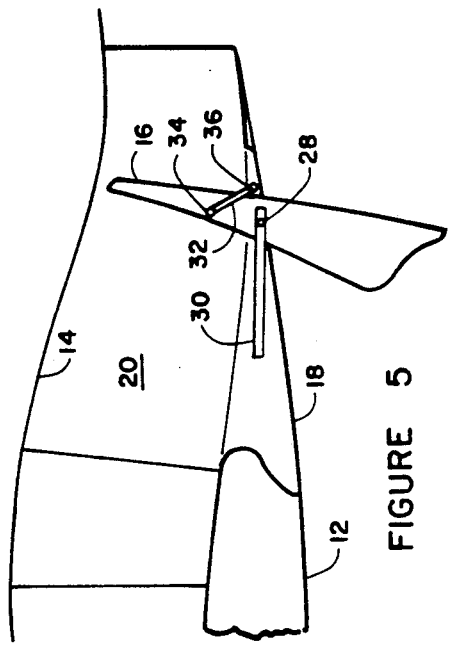
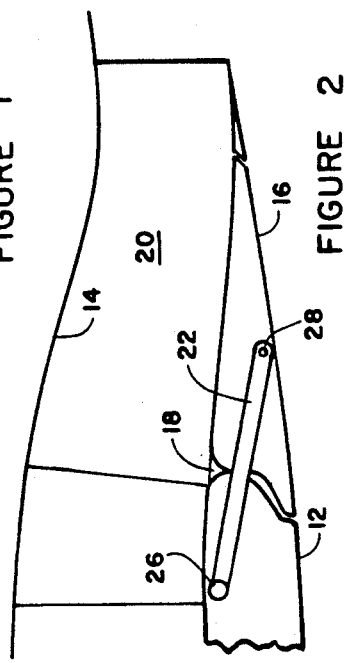
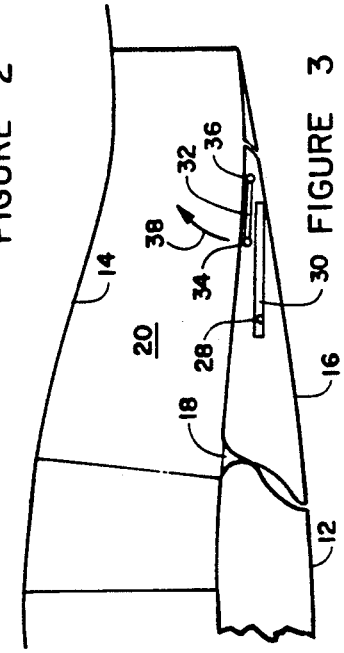

AIRCRAFT TURBINE ENGINE THRUST REVERSER WITH SLIDING HINGE ACTUATOR

BACKGROUND OF THE INVENTION

This invention relates in general to pivot door type thrust reversers for aircraft turbine engines and, more particularly, to such a thrust reverser having an actuation system using sliding hinges.

Modern aircraft fan jet engines have a nacelle or shroud surrounding the engine, spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the engine.

Aircraft using gas turbine engines tend to have high landing speeds, placing great stress on wheel braking systems and requiring very long runways. To reduce this braking requirement and permit use of shorter runways, means are now provided in such engines for reversing a major portion of engine thrust during the landing roll. Many different types of thrust reversers have been designed, of varying effectiveness.

With fan-jet engines, it is possible to block and reverse substantially all of the fan flow without excessive stress on the system, since a large part of the flow, core flow, continues through the engine. In some cases, sufficient reverse flow can be obtained by blocking only a substantial portion of the fan flow.

One type of thrust reverser often used in non-fan type turbine engines, uses a pair of large sturdy clam-shell like blocker doors which swing directly behind the jet exit nozzle and diverge forwardly to reverse thrust. This system must be very heavy and strong. Very complex and sturdy actuators are required for this system, which also tends to undesirably direct much of the reverse flow against aircraft structures.

Another type of thrust reverser uses cascade sets in the sidewalls of the engine nacelle with devices for uncovering the cascades to direct air flow through the cascades, which turn the airflow in a forward direction. Typical cascade type reversers include those disclosed by Montgomery in U.S. Pat. No. 4,145,877 and Hom et al in U.S. Pat. No. 3,500,646. While often effective in fanjet engines, these systems are mechanically complex, requiring a great many cooperating components.

Still another design uses pivotable doors lying in openings in the sidewall of the shroud or nacelle which pivot outwardly while a second set of doors pivot inwardly to block flow of air through the duct and direct it to the outwardly extending doors which direct air flow forwardly. Typical of these is the system disclosed by Ellis in U.S. Pat. No. 3,612,401. These systems, while useful in fan-jet engines, tend to be heavy and mechanically complex.

Yet another design uses a plurality of pivotable doors located in openings arranged radially around the shroud. Each door pivots so that one end contacts the engine cowl blocking air flow through the annular duct while the other end extends outside the nacelle in a direction directing airflow forwardly. Typical of these the systems disclosed by Maison et al in U.S. Pat. No. 3,605,411 and Fournier et al in U.S. Pat. No. 4,485,970. These thrust reversers tend to have greater mechanical simplicity than other systems. However, they often require complex actuation systems which may include components extending into the airflow path during normal engine operation, resulting in undesirable drag.

Thus, there is a continuing need for improved thrust reversing systems for use in aircraft turbine engines which combine highly effective flow reversal with low cost, light weight, mechanically simple actuation systems that do not impede air flow during normal engine operation.

SUMMARY OF THE INVENTION

The above problems, and others, are overcome in accordance with this invention by a thrust reverser system for use in aircraft turbine engines which includes a plurality of blocker doors stowed in radially located spaced openings in the engine nacelle wall during normal flight and which are rotatable and extendable by an extensible actuator to a deployed position in which the forward edge of each door extends outwardly and forwardly of the aft opening edge and the aft door edge extends into engine air flow blocking a major portion of the air flow and directing it outwardly and forwardly of the engine.

Each door assembly and actuator includes door slider pins on the longitudinal door edges that slide in a longitudinal track on the island between adjacent doors as the door moves rearwardly during deployment. A pair of hinged bars are pivotably attached at their aft ends to the island adjacent to each longitudinal side of the door and at their forward ends to the door edge. An extensible drive means, typically a hydraulic cylinder, is secured to the nacelle structure at the approximate center of the forward edge of the opening at the center of the door.

During normal engine flight operation, the door is stowed, filling the opening and providing streamlined inner and outer surfaces corresponding to the adjacent inner and outer nacelle surfaces. The deployment mechanism does not extend into the airflow so all undesirable added drag from that mechanism is avoided.

When reverse thrust is required, the extensible drive begins to move the door in an aft direction, with the door pins sliding along the island tracks, which extend is a substantially fore-and-aft direction. As rearward movement of the doors begins, the hinge bars rotate about the island ends, causing the aft ends of the doors to move inwardly toward the engine core. As the drive means are fully extended, the doors block air flow through the duct between engine core and nacelle and direct it outwardly and forwardly through the openings. The doors are returned to the stowed positions by reversing the above described deployment operation.

Since the blocker doors both rotate and translate aft as they deploy, larger thrust reverser openings can be provided compared to the fixed hinge type reversers of the prior art. Thus, smaller and lighter doors may be used. The kinematics of the system of this invention create a better potential for pressure closed doors, leading to a more fail-save overall design.

BRIEF DESCRIPTION OF THE DRAWING

Details of the invention, and of preferred embodiments thereof, will be further understood upon reference to the drawing, wherein:

FIG. 1 is a schematic side view of a fan jet engine incorporating the thrust reverser system of this invention;

FIG. 2 is a schematic section view taken on line 2—2 in FIG. 1 with the door stowed;

FIG. 3 is a schematic section view taken on line 3—3 in FIG. 1 showing the door stowed;

FIG. 4 is a schematic section view taken on line 2—2 in FIG. 1 but with the door deployed; and FIG. 5 is a schematic section view taken on line 3—3 in FIG. 1, but showing the door deployed.

DETAILED DESCRIPTION OF PREFERRED EMBODIMENTS

Referring now to FIG. 1, there is seen a conventional fan jet engine 10 including a nacelle 12 and a core 14. Near the aft end of nacelle 12 a plurality of blocker doors 16 are stowed in radially spaced openings 17 in the nacelle. Islands 18 between the blocker door openings provide support for portions of the door actuation mechanisms, as detailed below.

FIGS. 2 and 4 show section views taken longitudinally just before the centerline of a blocker door 16, on line 2—2 in FIG. 1. FIG. 2 illustrates blocker door 16 in the stowed, flight, position, while FIG. 4 illustrates the door in the deployed, reverse thrust, position. Conventional internal structure within nacelle 12 and door 16 have been eliminated for clarity of illustration.

As seen in FIG. 2, when blocker door 16 is stowed, inner and outer surfaces of door 16 conform to the inner and outer nacelle surfaces, providing a low drag configuration in both the outside air stream and the airflow through the duct 20. In this stowed position, no components of the door actuation or deployment system extend into these air streams. Door 16 is deployed by an extensible rod-like means 22, typically a hydraulic cylinder, or the like. Extensible rod 22 is pivotably secured at 24 within the forward edge of the door opening 17, preferably substantially on the door centerline. The second end 26 of rod 22 is pivotably secured to door 16. When reverse thrust is desired, rod 22 is extended, moving end 26 rearwardly. As guided by the actuating means shown in FIGS. 3 and 5 and discussed below, blocker door 16 pivots to the position shown in FIG. 4, with the upper end of the door substantially in contact with (or adjacent to) engine core 14 and the lower end extending out through opening 17 so that all doors 16 cooperate to direct most of the air flow through duct 20 outwardly; and forwardly of the engine. Doors 16 and openings 17 are tailored so that the contiguous sides of adjacent doors are in a close relationship.

The deployment door guide system is shown in FIGS. 3 and 5, which are schematic section views taken on line 3—3 in FIG. 1; that is, along the door edge, just inside the adjacent island 18 to shown components mounted on both door 16 and island 18.

Outwardly extending pins or sliders 28 are provided on the edges of each door 16, extending into tracks 30 on the corresponding adjacent islands 18. As extensible 22 (FIGS. 2 and 4) moves door 16 rearwardly, pins 28 (two per door) slide along tracks 30. Meanwhile, hinged bars 32 on each side of each door 16, each having a first end 34 fastened to the edge of door 16 and a second end 36 fastened to the edge of island 18 rotates in the direction shown by arrow 38 in FIG. 3. Thus, the door rotates counterclockwise while the entire door moves rearwardly to the position shown in FIG. 5. To return the doors 16 to the stowed position, extensible rod 22 (FIGS. 2 and 4) is retracted so that pins 28 and bars 32 move from the position shown in FIG. 5 to that of FIG. 3.

Other applications, variations and ramifications of this invention will occur to those skilled in the art upon reading this disclosure. Those are intended to be included within the scope of this invention, as defined in the appended claims.

I claim:

1. A thrust reverser system for fan jet type aircraft engines which comprises:

a plurality of radially arranged openings through the engine nacelle near the aft end of the nacelle and having nacelle islands therebetween;

a blocker door filling each of said openings and having inner and outer surfaces substantially corresponding to the adjacent inner and outer nacelle surfaces;

an extensible drive means operatively connected between said nacelle and said door to selectively translate said door rearwardly from a stowed to a deployed position and forwardly from said deployed position to said stowed position;

cooperatively located outwardly extending pins secured to the longitudinal edges of each of said doors and tracks secured to the adjacent islands; and hinged bar means located at each longitudinal door edge having a first end pivotably secured to the door edge and the second end pivotably connected to the adjacent island;

whereby as said drive means translates said door rearwardly said pins move along said tracks and said hinged bars rotate to a position in which said door is near the aft end of said opening, the aft end of said door is near said core and the forward end of said door extends outwardly and forwardly of the aft end of said opening.

2. The thrust reverser system according to claim 1 wherein said extensible drive means comprises a jackscrew or hydraulic cylinder.

3. The thrust reverser system according to claim 1 wherein said tracks run longitudinally substantially parallel to each other.

4. The thrust reverser system according to claim 1 wherein each of said hinged bar means comprises a bar having a forward said first end secured to said door and an aft second end secured to said island whereby said door pivots about said pins.

5. The thrust reverser system according to claim 1 wherein said extensible drive means lies substantially along the centerline of said door.

6. A thrust reverser system for fan jet type aircraft engines which comprises:

a plurality of radially arranged openings through the engine nacelle near the aft end of the nacelle and having nacelle islands therebetween;

a blocker door filling each of said openings and having inner and outer surfaces substantially corresponding to the adjacent inner and outer nacelle surfaces;

an extensible drive means located substantially along the centerline of said door, operatively connected between said nacelle and said door to selectively drive said door rearwardly from a stowed to a deployed position and forwardly from said deployed position to said stowed position;

cooperatively located outwardly extending pins secured to the longitudinal edges of each of said doors and tracks secured to the adjacent islands, running substantially parallel to the each other; and hinged bars located at each longitudinal door edge having a forward first end pivotably secured to the door edge and aft second end pivotably connected to the adjacent island;

whereby as said drive means drives said door rearwardly said pins move along said tracks and said hinged bars rotate to a position in which said door is near the aft end of said opening, the aft end of said door is near said core and the forward end of said door extends outwardly and forwardly of the aft end of said opening.

7. The thrust reverser system according to claim 6 wherein said extensible drive means comprises a hydraulic cylinder.

* * * * *